(12) United States Patent
Morris et al.

(10) Patent No.: US 10,809,052 B1
(45) Date of Patent: Oct. 20, 2020

(54) SYSTEM FOR MEASURING CRIMPED CONTAINER SEAMS

(71) Applicant: ONEVISION CORPORATION, Westerville, OH (US)

(72) Inventors: Neil Morris, Westerville, OH (US); Ben Allen, Westerville, OH (US)

( * ) Notice: Subject to any disclaimer, the term of this patent is extended or adjusted under 35 U.S.C. 154(b) by 0 days.

(21) Appl. No.: 16/576,758

(22) Filed: Sep. 19, 2019

Related U.S. Application Data

(60) Provisional application No. 62/733,212, filed on Sep. 19, 2018.

(51) Int. Cl.
*G01B 11/16* (2006.01)
*G01B 11/30* (2006.01)
*G01B 11/24* (2006.01)

(52) U.S. Cl.
CPC .............. *G01B 11/16* (2013.01); *G01B 11/30* (2013.01); *G01B 11/24* (2013.01)

(58) Field of Classification Search
CPC .......... G01B 11/16; G01B 11/30; G01B 11/24
See application file for complete search history.

(56) References Cited

U.S. PATENT DOCUMENTS

| | | | | |
|---|---|---|---|---|
| 4,600,347 A * | 7/1986 | Segredo | ................. | B21D 51/30 413/26 |
| 5,017,795 A * | 5/1991 | Dower | ................. | G01N 21/909 250/559.19 |
| 5,104,226 A * | 4/1992 | Eble | ......................... | G01B 9/08 356/240.1 |
| 5,386,293 A * | 1/1995 | Barnard | ............... | G01N 21/909 348/125 |
| 5,617,204 A * | 4/1997 | Hinata | ............... | G01N 21/9054 250/223 B |
| 6,359,434 B1 * | 3/2002 | Winslow | ............ | G01N 27/9046 324/220 |
| 6,623,230 B1 * | 9/2003 | Bagheri | ................. | B21D 51/30 413/31 |
| 7,260,177 B2 * | 8/2007 | Hirose | .................. | G06T 7/0004 250/359.1 |
| 7,736,112 B2 * | 6/2010 | Davies | ............... | B21D 51/2653 413/31 |
| 2008/0022632 A1 * | 1/2008 | Gysi | ................. | B29C 66/91221 53/377.7 |
| 2011/0187394 A1 * | 8/2011 | Rodel | ..................... | E02D 31/02 324/699 |
| 2019/0378266 A1 * | 12/2019 | Takahashi | ............ | G06K 9/4604 |
| 2020/0156916 A1 * | 5/2020 | Knott | ........................ | B67C 3/26 |

* cited by examiner

*Primary Examiner* — John B Strege
(74) *Attorney, Agent, or Firm* — Calfee, Halter & Griswold LLP

(57) ABSTRACT

Disclosed is an automated system for measuring seam parameters of a crimped closure can and for determining seam tightness using the measured parameters. The system includes an image recording device with a magnifying lens which receives an image of a cross-sectioned seam. The automated system detects voids in the seam and compares the characteristics of those voids against predetermined standards to identify improperly formed seams and alert an operator.

13 Claims, 13 Drawing Sheets

SYSTEM FOR MEASURING CRIMPED CONTAINER SEAMS

CROSS-REFERENCE TO RELATED APPLICATION

This application claims priority to and all benefit of U.S. Provisional Patent Application Ser. No. 62/733,212, filed on Sep. 19, 2018, for SYSTEM FOR MEASURING CRIMPED CONTAINER SEAMS, the entire disclosure of which is incorporated herein by reference.

FIELD

This disclosure generally relates to the manufacture, filling, and sealing of cans used in preservation and delivery of food products.

BACKGROUND

The present disclosure relates to a system for measuring the seams of crimped metal materials, and in particular for assaying the quality of seams during manufacturing of cans for perishable products, such as food cans.

Although the process of storing sterilized food products in containers dates to the Napoleonic Era, the effective use of metal cans with crimped sealed ends dates to about the turn of the 20th Century. The modern double crimped seams or double seams, provide for a robust airtight seal for a metal can. Thus, the hermetic seal of the "double seam" is an effective barrier to the entry of microorganisms.

Metal cans traditionally have been formed from two or three metal sheets. A three-piece can has one rectangular sheet rolled into a can cylinder body, with the cylinder closed by a laterally placed body seam. Circular end sheets are attached to the bottom and top of the can cylinder body. In the past, lateral and end seam seals may have been formed by soldering. The modern-day attachment of the end sheets as lids, is accomplished by formation of a rolled double seam. In a two-piece can, the can cylinder body and the bottom of the can are formed from a single continuous sheet of can material (most commonly aluminum or steel). Following filling of the can, the lid is placed on the vessel and sealed by a double seam. Effective formation of a double seam ensures a seal that is impervious to the entry of contamination and that prevents the escape of the can contents to the environment.

The double seam is formed by a series of rolling actions that shape the perimeter of the end sheet and of the can cylinder body into an interlocking pair of two tight continuous folds between the can's cylindrical body and the lids. The manufacture of a sanitary can typically begins by shaping a rectangular sheet around a die, and then forming a cylinder by crimping or welding the side seam. A flange is formed by rollers around the perimeter of one end of the cylindrical can body. The lid is cut as a circular sheet, and then an upraised lip or end curl is formed around the lid, so that the lid will fit snugly into the flanged edge of the can body.

After a can is filled, a lid can be placed atop the other end of the can body. A can seamer is used to form a double seam between the can body and the lid. The double seam operation is performed inside a seamer machine. The cover or lid is seated into a chuck, the filled can body rests on an associated base plate, and the lid carried by the chuck, and the cover is installed into the open end on the filled can body. The cover and can flange are then folded twice into a completed double seam.

In a first operation, the seamer head is engaged, and presses a first operation roller against the end curl of the lid, thereby engaging against the flanged edge of the can body, further curling the end curl under the can body flange. Thereafter the first operation roller is retracted from contact with the newly formed loose seam.

Following retraction of the first operation roller, the seamer head engages second operation rollers for completing the loose seam. The second operation rollers then press all the layered seam components into permanent tight apposition to form the final hermetic seal. If a section were made through the seam, five layers of can materials would be encountered, namely a) lid cover, b) body hook, c) cover hook, d) body, and e) lid countersink. For aseptic packaging, the can may be coated or a sealant placed within the seam in order to maintain a hermetic seal.

The proper operation of a can seamer is critical for forming uniform and reliable double seams. Set up and maintenance of a can seamer must be monitored in order to avoid the entry of defective or ineffective double seams, and potential product contamination or leakage into the stream of commerce.

Existing systems utilize a variety of measuring systems for monitoring and ensuring the quality of can double seams, such as for steel or aluminum cans holding food products. Seams must be of sufficient quality to avoid any risk of failure, leakage, and microbial contamination. A regulatory framework is in place to provide for continuing quality control and assessment of seam quality and efficacy of seam formation and sealing in order to assure that food products are contained within cans that have been hermetically sealed for stable aseptic packaging. See, for example, "USDA-9 CFR 381.301—Containers and Closures" US Department of Agriculture. 2012; and "US FDA-Guide to Inspections of Low Acid Canned Food Manufacturers," US Food and Drug Administration (2012).

One important measurement of seam quality is seam tightness. As the cover hook is formed in relation to the end and the body, deformation of the cover hook in relation to the contiguous end requires deviation of the cover hook from a planar surface, into a series of dimples or wrinkles. The presently accepted method for evaluating seam tightness is wrinkle evaluation, i.e., scoring the depth number and regularity of the cover hook of the seam. In order to perform the wrinkle evaluation the cover hook must first be disassembled or stripped from the double seam. The cover hook wrinkles are then scored in relation to standards.

This conventional process of wrinkle evaluation is quite difficult to perform and is potentially unreliable in practice because a trained human inspector must visually evaluate stripped seams for the percentage depth of the wrinkle on a cover hook having a total depth of only 0.060 to 0.100 inches. In addition, the amplitude and direction of the wrinkle must be observed to distinguish between wrinkle and reverse wrinkle. Consequently, these critical measurements are subjective and rely on the judgment of the inspector, with said inspectors being subject to fatigue or variable diligence. For additional discussion of quality assurance in can sealing operations, see Vasconcellos, J. A. "Quality Assurance for the Food Industry: A Practical Approach" (2003) CRC Press, ISBN 9780849319129. See also Yam, K. L., "Encyclopedia of Packaging Technology," John Wiley & Sons, 2009, ISBN 978-0-470-08704-6.

Thus, the established process of evaluating seam quality parameters, including wrinkle evaluation, is tedious and imprecise. For example, technicians can suffer fatigue and reduced efficiency over time in evaluating seam parameters. A better system and method for evaluating seams is needed for ensuring the continued maintenance and reliability of this critical aspect of the food supply.

SUMMARY

In an exemplary embodiment, a system for measuring the crimp tightness of a container double seam comprises: a processor, an image capture device in communication with the processor, a memory in communication with the processor, the memory comprising instructions that when executed by the processor cause the processor to: capture an image of a seam cross section using the image capture device, store the captured image, determine at least one of a container wall thickness and a container lid thickness, identify at least one void in the seam cross section, calculate a ratio using a dimension of the void and at least one of the container wall thickness and the container lid thickness, determine if the ratio falls outside of a predetermined range, and provide an indication to a user if the ratio falls outside of the predetermined range.

In another exemplary embodiment, a system for measuring the crimp tightness of a container double seam comprises a processor, an image capture device in communication with the processor, a memory in communication with the processor, the memory comprising instructions that when executed by the processor cause the processor to capture an image of a seam cross section using the image capture device, store the captured image, identify at least one void in the seam cross section, characterize the shape of the at least one void, determine if the characterized shape falls outside of a predetermined range, and provide an indication to a user if the characterized shape falls outside of the predetermined range.

In another exemplary embodiment, a method of measuring the crimp tightness of a container double seam comprises: capturing an image of a seam cross section using the image capture device, storing the captured image, determining at least one of a container wall thickness and a container lid thickness, identifying at least one void in the seam cross section, calculating a ratio using a dimension of the void and at least one of the container wall thickness and the container lid thickness, determining if the ratio falls outside of a predetermined range, identifying at least one void in the seam cross section, characterizing the shape of the at least one void, determining if the characterized shape falls outside of a predetermined range, and providing an indication to a user if at least one of the following conditions are true: the ratio falls outside of the predetermined range and the characterized shape falls outside of a predetermined range.

This Summary describes various exemplary embodiments to provide a basic understanding of some aspects of the disclosure. Accordingly, it will be appreciated that the above described exemplary embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

Features, objects and advantages other than those set forth above will become more readily apparent when consideration is given to the detailed description below. Such detailed description makes reference to the following drawings.

DETAILED DESCRIPTION

Cylindrical metal cans with crimped seams around the top and/or bottom date to the turn of the 20th Century. Throughout this extended time period of use, a variety of metals such as tin-plated steel or tin-plated iron, steel, and aluminum, have been used to form the structure of a can. More recently cans formed of composite materials, or using both metal and composite materials have come into use. For the purposes of this disclosure, cans that are hermetically sealed are directed for primary attention, although other cans or containers are adaptable for use with the invention described herein.

The disclosed system provides an apparatus and method for readily assaying the quality of can assembly by measuring, recording, and tracking the key parameters of samples from the assembly process. Thus, use of the system allows for the detection and prediction of seam quality, particularly double seam quality, and the system enables correction of faults in can assembly before such faults become a significant issue.

Figure 1A:
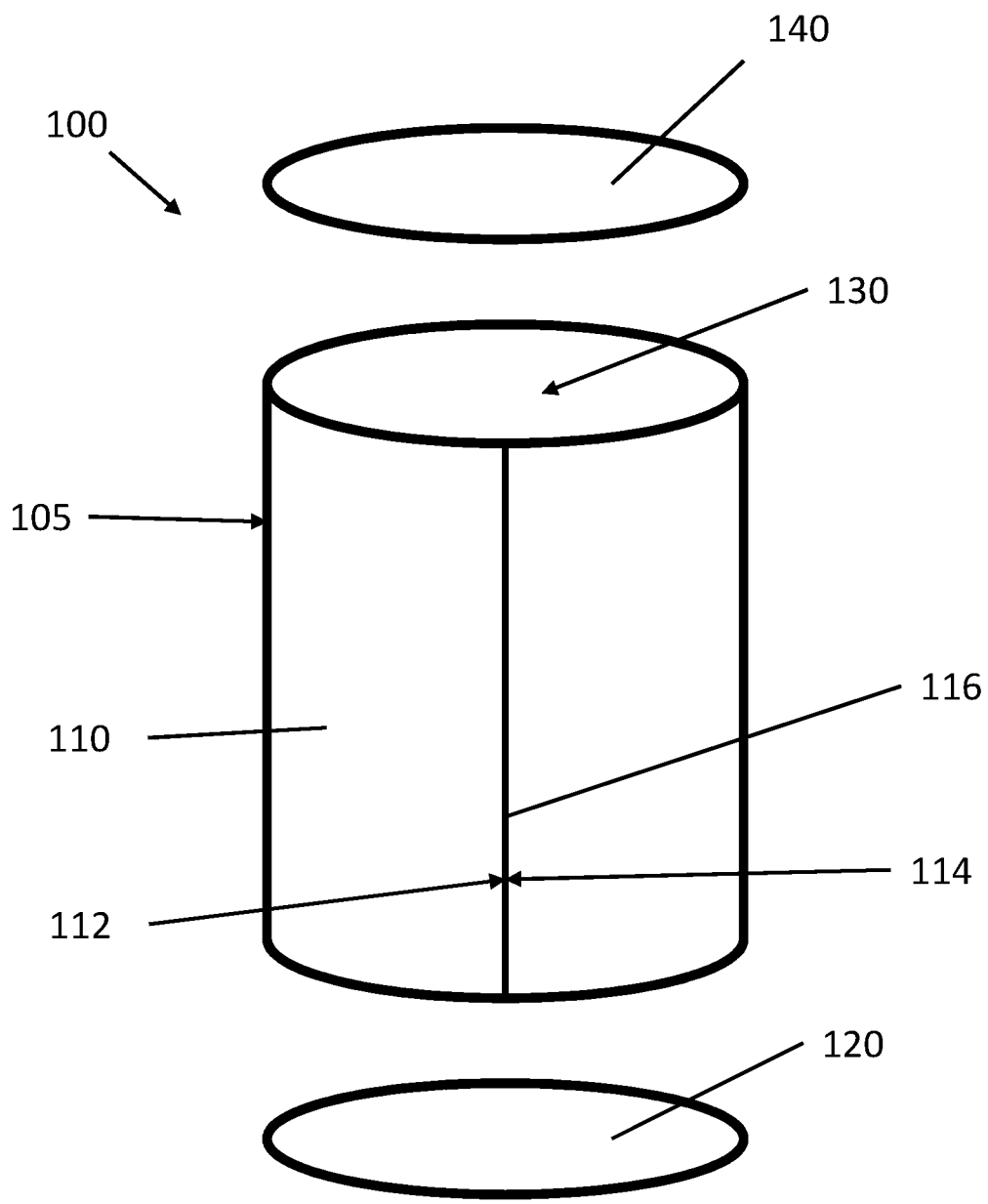
FIG. 1A is an exploded diagram of a can with top and bottom seams.
Figure 1B:
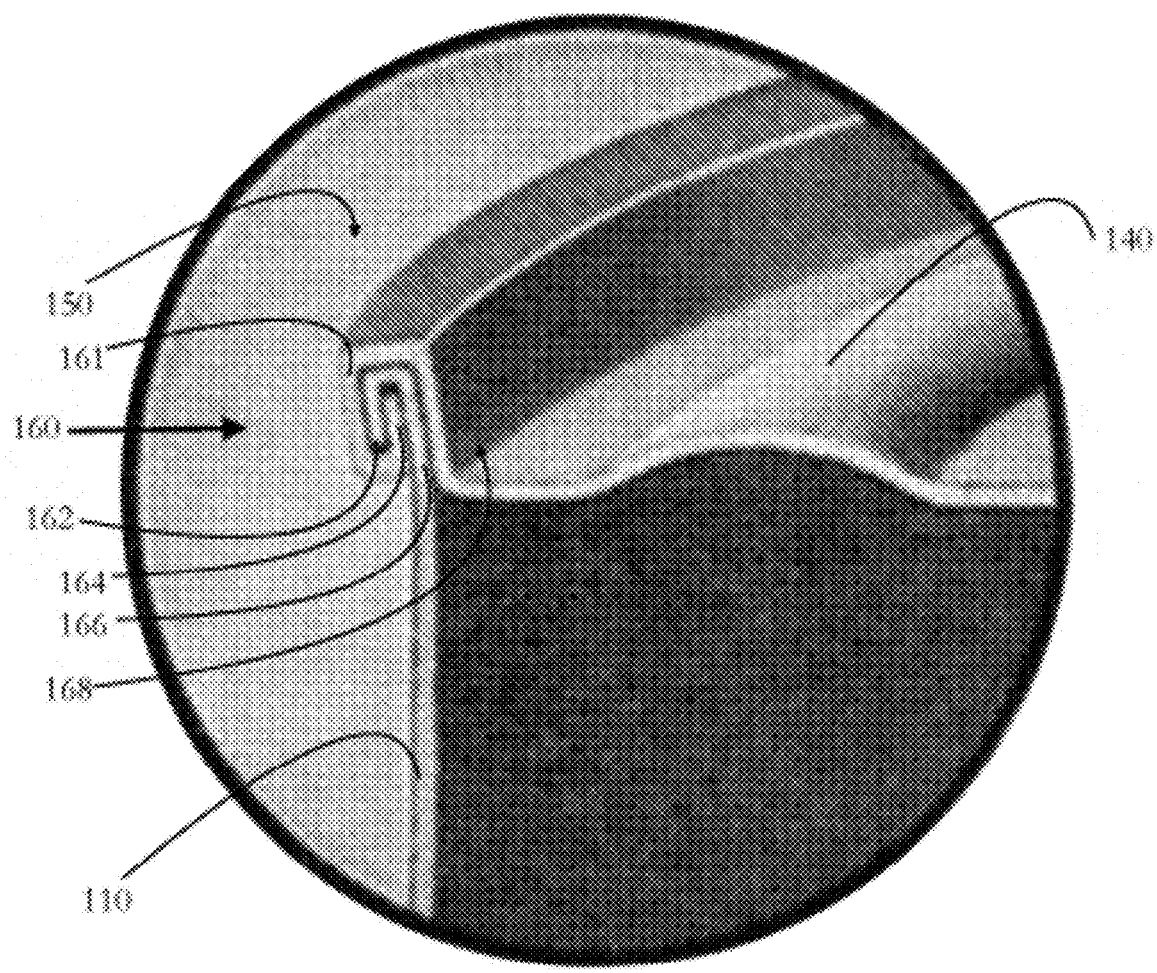
FIG. 1B is a detailed view diagram of a can top to can sidewall connection.

FIG. 1A shows an abstracted diagram of a common can, while FIG. 1B shows an abstracted diagram of a cross section of a top to body seam. Can 100 has a cylindrical can body 105 that is formed from a generally planar side sheet 110, that was shaped into an open cylinder, with edges 112 and 114 connected by side seam 116. A can bottom 120 will be shaped and joined with the can body 105 through a double seam, bottom seam, that occupies the perimeter of can bottom 120 in relation to can body 105. The bottom seam is a continuous seam with a circular aspect. Referring now to FIG. 1B which provides a detailed view of a double seam, the lid 140 has been shaped and joined with the can body 105 through a double seam, top seam 150, that also occupies the perimeter of lid 140 in relation to can body 105. The can body in conjunction with the bottom 120 and lid 140 forms interior space 130, holding contents that are added prior to attachment of the lid 140.

The detail in FIG. 1B is drawn to the top seam, showing the juncture of the lid 140, in relation to the can body 110. Thus, by approaching the can in the direction of arrow 160, encountered are lid cover 161, downward facing body hook 162, upward facing cover hook 164, can body 166, and lid countersink 168. The anatomy shown in FIGS. 1A and 1B applies to a wide variety of can shapes, as further described below. Further disclosure regarding the technology of can manufacture and use can be found by referring to Kraus, F.

J. (2009). "Steel Cans". In Yam, K L. Encyclopedia of Packaging Technology. Wiley. pp. 205-216.

The disclosure herein applies directly to the manufacture, filling, and sealing of cans used in preservation and delivery of food products. As such, cans must be hermetically sealed to prevent any entry of microbes or other contaminants in any form to the contents of the sealed can. Once a sealed can has been sterilized, most commonly by heating under pressure to a given temperature (such as 110° C. or 121° C., for instance), the hermetic seal of the can allows for long periods of storage without spoilage of the contents of the can. The most common form of a can is as a right cylinder. The right cylinder shape is readily formed from three flat pieces, the side sheet, a lid and a bottom. Those skilled in the art will recognize that in the past century two-piece metal cans have come into use, with the side sheet and bottom integrally formed, and then a lid sealed on top.

Most cans are manufactured through an automated system of machinery. The present disclosure allows for monitoring the quality of cans produced during manufacture, during sealing and during storage or use. With respect to three-piece cans, manufacturing a can proceeds from forming a tube by rolling the side sheet, and then sealing the side seam, such as by well-known processes such as crimping, welding or soldering the lateral seam and joining the ends of the side sheet. Commonly the side sheet is a rectangle with the shorter side of the rectangle used to form the side seam. It should be obvious that the shape of the side sheet varies according to the requirements for certain products contained within the can. The side height to diameter ratio of the can cylinder can vary across a wide range, such as about 1:4 for a common "tuna can" to 2:1 for a common "soup can." Side sheets may also be formed with one or more ribs to reinforce the can shape.

Following formation of the can body from the side sheet, the bottom of the can is installed to permanently seal the can bottom to the side sheets, as indicated in relation to FIGS. 1A and 1B. The quality of the joining of the can bottom to the can body is commonly through use of a double crimped seam, and the integrity of the closure of that seam can be analyzed through implementation of the presently disclosed system. Once the can bottom is sealed, the can, now as an open-ended container may be packed for shipment to food processing facility for filling.

The open can is filled with product, and the lid installed. After installation of the lid, the lid is sealed to the sides of the can body. When a can is used to store food or other products subject to spoilage or microbial degradation, the finished can is sterilized, by high pressure steam for instance. Labels may be affixed to the can body at some chosen point in the process or printed directly on the side sheet.

The process of joining the wall of the side sheet forming the can body to the lid often is most through the process of forming a double crimped seam, or double seam, from the material of the can body and the lid, as disclosed above. To reiterate, double seams are used by can fillers and can manufacturers to ensure a high quality and hermetic seal inside a metal can container holding food and beverage products. The proper quality hermetic seal provides for long durability of the can contents and effectively separates the can contents from environmental hazards and microbial or environmental contamination.

An important, if not critical aspect of the manufacture of cans, and the hermetic sealing of filled cans, is the quality of the seam that is formed. One method to assay seam quality is measurement of seam tightness. Seam tightness is affected by the materials forming the seam, combined with the force from the second operation seamer roll against the double seam. Examination and assay of seam quality for a particular can lid seaming device (seamer head) and for a production line can be implemented by direct examination of a finished seam. Referring briefly to FIG. 1B, a cross section of the seam comprising lid cover 161, body hook 162, and cover hook 164 is cut by a saw and examined by a light microscope associated with a digital imager, with the image of the edge of the cut segment.

Figure 2:
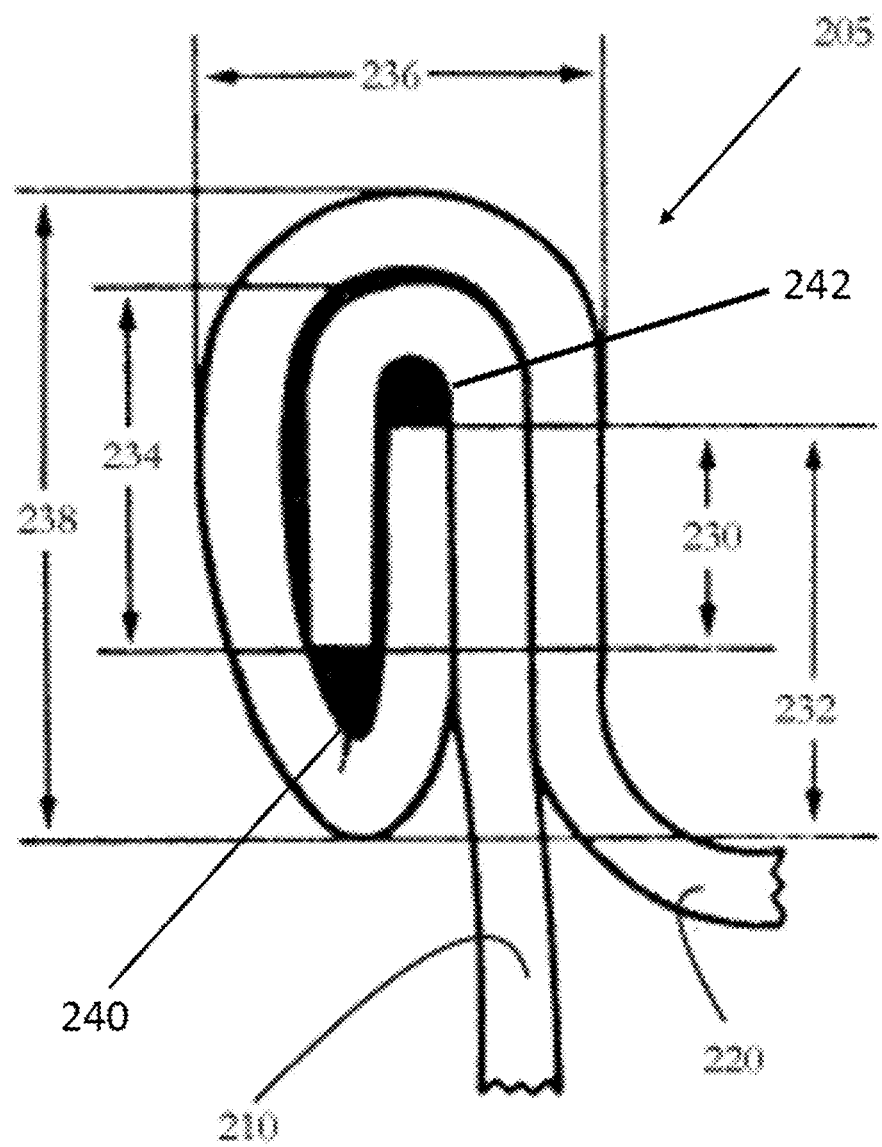
FIG. 2 is a cross-sectional view of a can closure.

FIG. 2 shows a diagram and micrograph of a seam cross section. The figure shows a cross section diagram of a finished double seam 205. The double seam joins the side sheet body 210 to the cover or lid 220. An effective double seam has a cover hook 264 crimped to a body hook 262. The cover hook 264 and body hook 262 have a specified overlap region 230, while the cover hook length is shown by dimension 232, and body hook length 234. The total width of the finished seam is shown by dimension 236 and total height of the seam is shown by 238. A cover hook tunnel 240 and body hook tunnel 242 are shown as voids on the diagram, and could be measured by volume or height, for instance as left void height and right void height respectively. It may also be useful to compare body wall thickness with finished body hook wall thickness and cover wall thickness with finished cover hook thickness.

Since the system is already implemented to provide for seam segment micrographs, identifying any structural defects, such as fracture is practical and potentially critical. The size of the overlap region 230 is one of the critical parameters for forming an effective double seam. The formation of a complete double seam, as diagrammed in FIG. 2, is completed through the described multi-step process.

As noted, the proper completion of the double seam operation is performed inside a complex seamer machine. The operation requires the effective interaction and the can, cover, can flange, and seamer head, including seamer head rollers. If these components are not properly set up, or begin to operate outside allowable tolerances, defective completed double seams can result. Additionally, in a production environment, an operating seamer machine typically contains multiple heads.

The effectiveness of the can closure operation is critical for can fillers and also for can manufacturers, and thus, requires continuing routine checks to ascertain that the quality of finished cans is always maintained. The failure of cans to be filled and effectively sealed could directly lead to a public health emergency due to contaminated food products, and to substantial and irreparable damage to the reputation and good will of any manufacturer shipping cans with ineffective seals to consumers.

Thus, maintaining consistent quality of the can closure is of the utmost importance, both for delivering quality product to the end-user, but also because there are a number of regulations that require specific elements indicating closure quality. One of these regulations is promulgated by the Food Safety and Inspection Service of the USDA and is found in 9 C.F.R. § 381.301, "Containers and Closures," the disclosure of which is hereby incorporated by reference. Ensuring a proper seal requires that the dimensions of the internal seam components are within specifications. These specifications in effect require that a can closure be a hermetic seal. In practice, the FDA requires tests every 4 hours on a complete set of cans from a seaming line, with at least one sample from each seamer head implemented by a can sealing machine.

These tests on cans are destructive in nature, requiring a seam to be stripped, i.e. manually torn apart or alternatively cut into segments, and inspected by measuring the components of the cross-sections of the double seam as shown in relation to FIG. 2.

In relation to the present system, a seam saw is used to cut a cross section segment from the inspected seam, as shown in relation to FIG. 2. In practice, from 1 to 4 sections are made at regular intervals about the seam. Seam segments are imaged to collect high-resolution microscopic images of the seam cross section. These collected images can then be analyzed by the disclosed automated system. The system identifies certain landmark parameters from which seam quality can be determined. Such tests provide valuable information about the anatomy of double seam overlap, body and cover hooks, body and cover hook butting, seam height and thickness.

The overlap of cover hook and body hook can be measured through the just described destructive testing and microscopic examination. In addition to the described overlap and seam thickness measurements, the size and shapes of seam tunnels formed in the completed seam can be examined. An additional parameter that can be determined is the depth of wrinkles formed in the cover hook or body hook during seam formation.

In addition to fitting dimensional characteristics, the completed double seam must have the correct tightness. Correct tightness is a critical parameter because a double seam that is too loose is expected to fail and eventually leak. Likewise, a double seam that is too tight is also expected to fail and eventually leak. Prior to the present disclosure, seam tightness was traditionally evaluated by physically stripping the cover hook from the double seam and visually evaluating the percentage depth of the wrinkle on the cover hook.

Figure 3A:
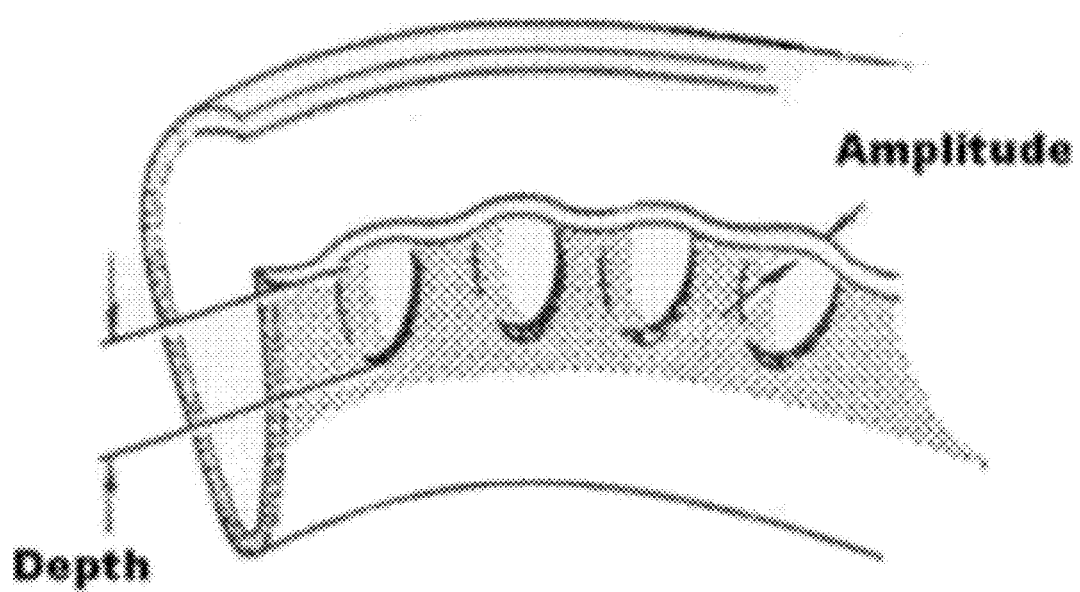
FIGS. 3A and 3B show seam tightness scale examples.
Figure 3B:
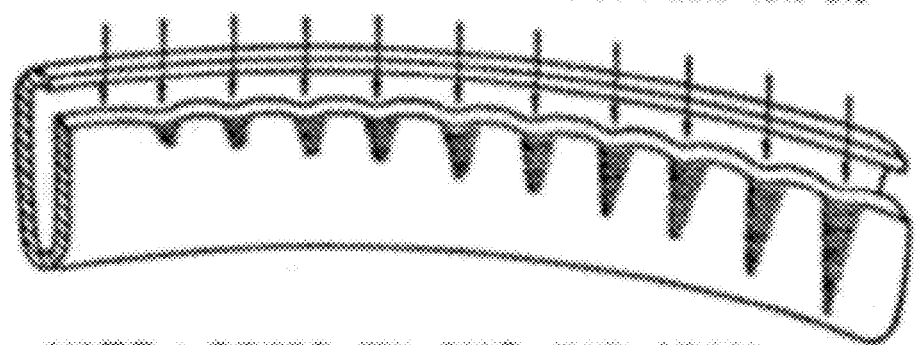

FIGS. 3A and 3B show two diagrams that are useful for those evaluating seam tightness through traditional methods. FIG. 3A shows a scale relating the wrinkle pattern to relative seam tightness. FIG. 3B shows parameters for evaluating wrinkles from a stripped seam.

The disclosed automatic seam tightness measurement system quantifies wrinkle rating by interpreting the patterns of the materials and tunnels in the double seam cross section. This new measurement is integrated with internal double seam measurements resulting in no additional effort for the inspector during the double seam inspection process.

To practice wrinkle evaluation as illustrated in FIGS. 3A and 3B on the cover hook of the seam, a segment of a finished can seam is cut from the object can, and the cover hook is manually stripped from the seam. A seam inspector then visually evaluates the wrinkles in the formed cover hook and scores the percentage depth of wrinkles. As noted, wrinkle evaluation is difficult in practice because the inspector must visually evaluate the percentage depth of the wrinkle on a cover hook having a total depth of only 0.060 to 0.100 inches. In addition, the amplitude and direction of the wrinkle must be observed to distinguish between wrinkle and reverse wrinkle. Consequently, this critical measurement can be highly subjective and relies on the judgment of the inspector.

In the operation of the present system, the consistent quality of any micrographic image of a seam or seam cross-section is an important factor in utilizing the automated system to determine seam quality. The quality of the microscopic image for determining the double seam cross section varies depending on the amount and location of debris on the surface of the cross section combined with the quality of the saw cut. The disclosed system provides automatic illumination in combination with a method for image signal processing to interpret the patterns and dimensions of the materials and tunnels in the seam images being evaluated. The patterns, dimensions, or both are correlated to a seam cross section parameter database to provide a rated tightness measurement. This automated tightness measurement rating allows can inspectors to estimate or determine a scored seam wrinkle rating, without stripping every examined seam. The method provides for an estimated wrinkle rating by interpreting the shape and dimensions of the double seam tunnels compared to the material thickness.

Figure 4A:
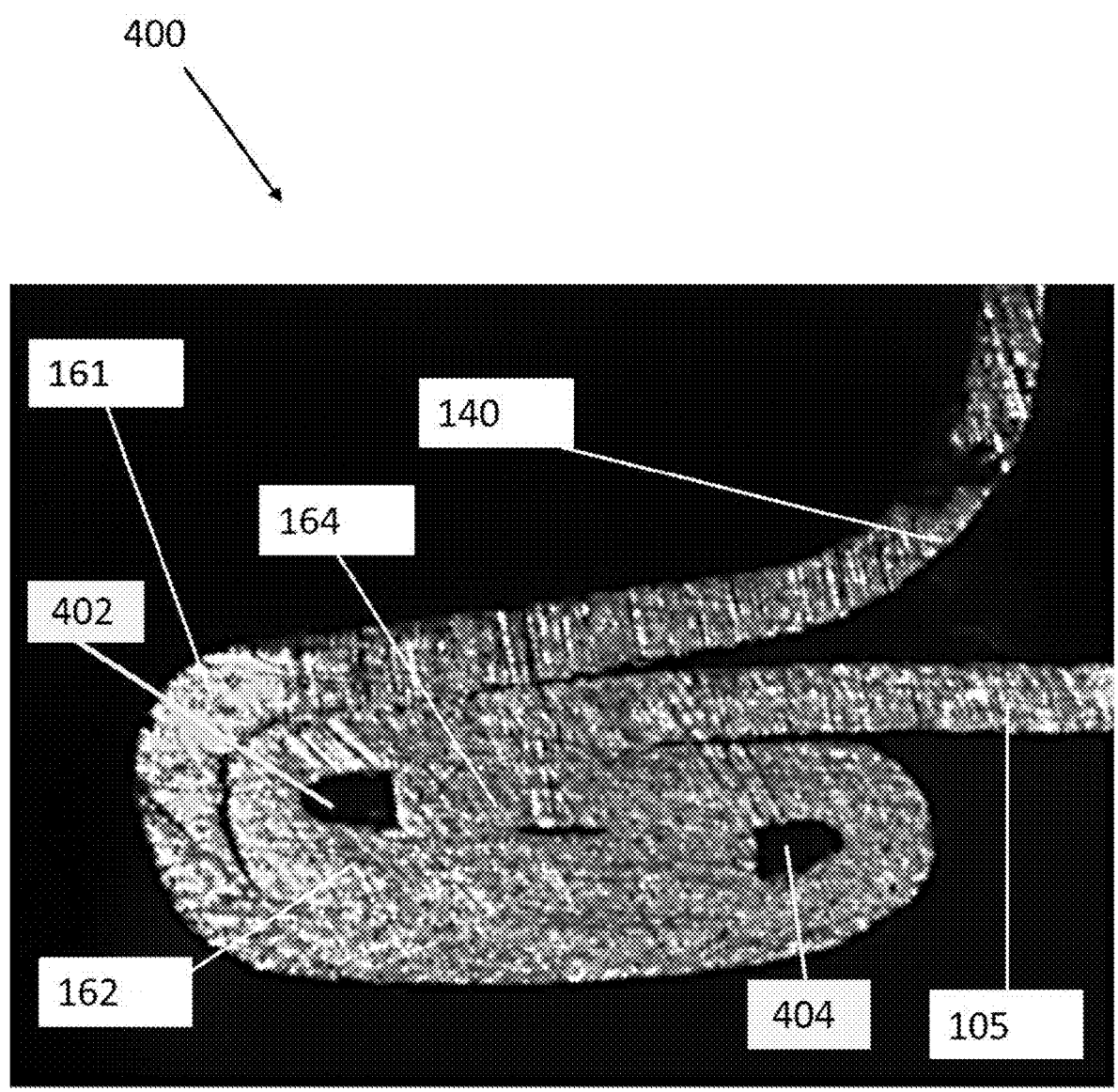
FIGS. 4A-4D show examples of analyzed seams.

Referring to FIGS. 4A-4D which illustrate a seam cross section 400. In FIG. 4A, the lid 140 is folded to form the lid cover 161 which wraps around the downward facing hook 162 formed from the can body 105 to result in an upward facing cover hook 164. This assembly is then pressed together.

Figure 4B:
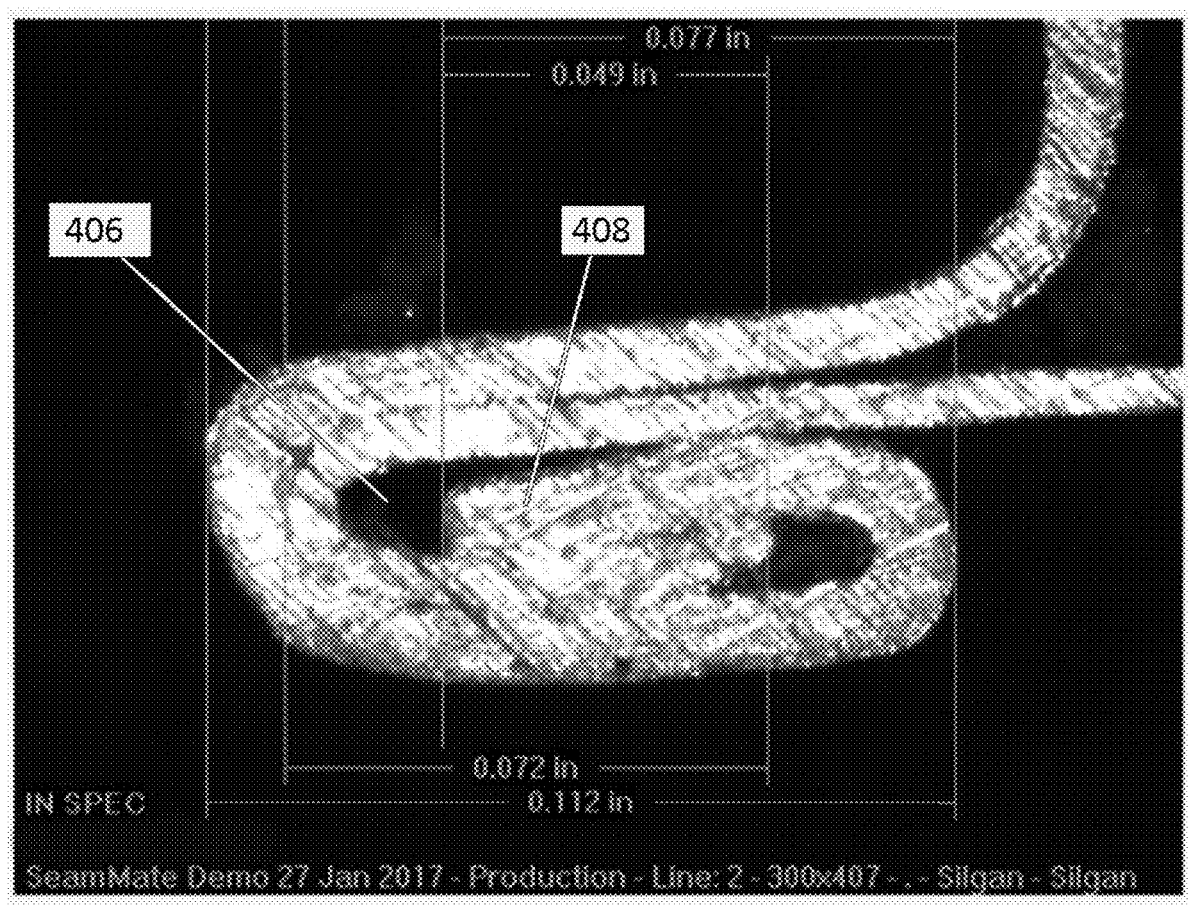
Figure 4C:
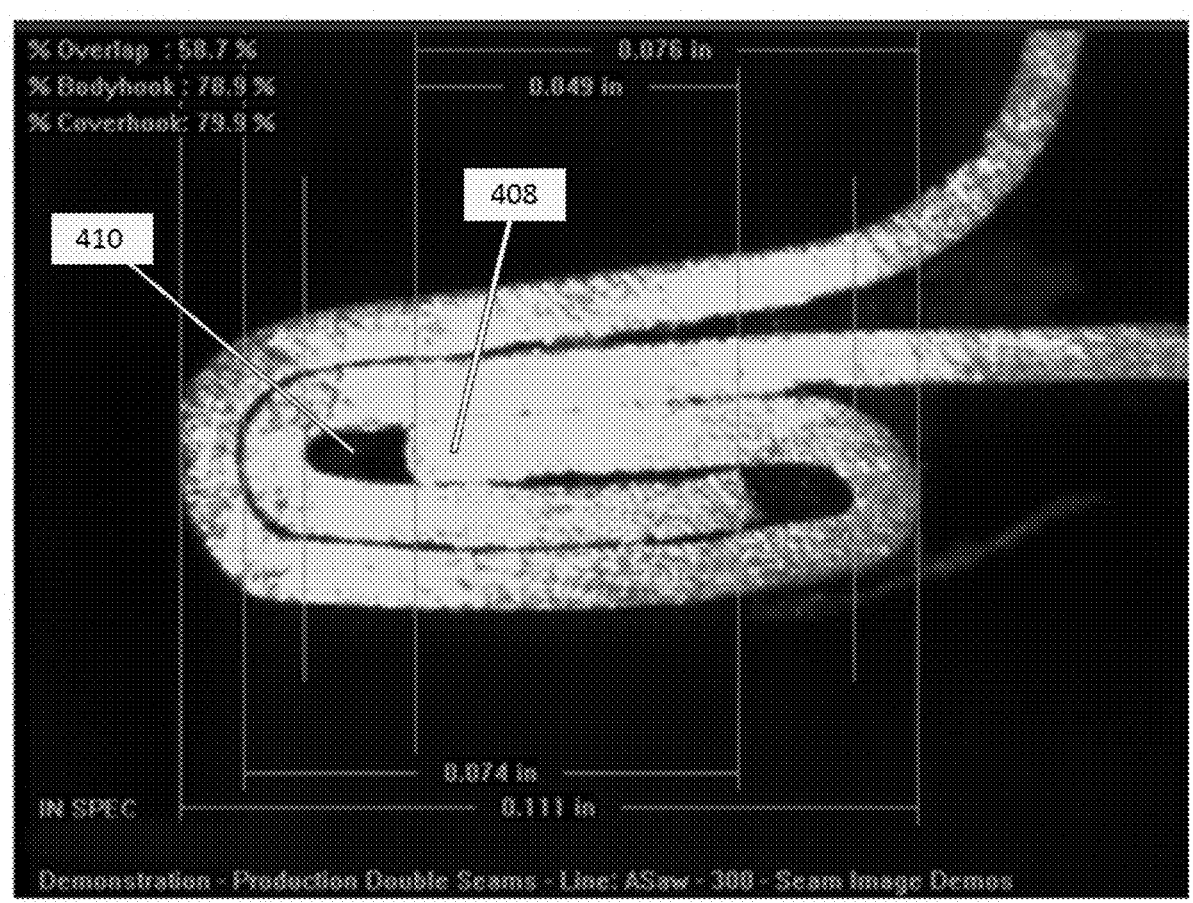
Figure 4D:
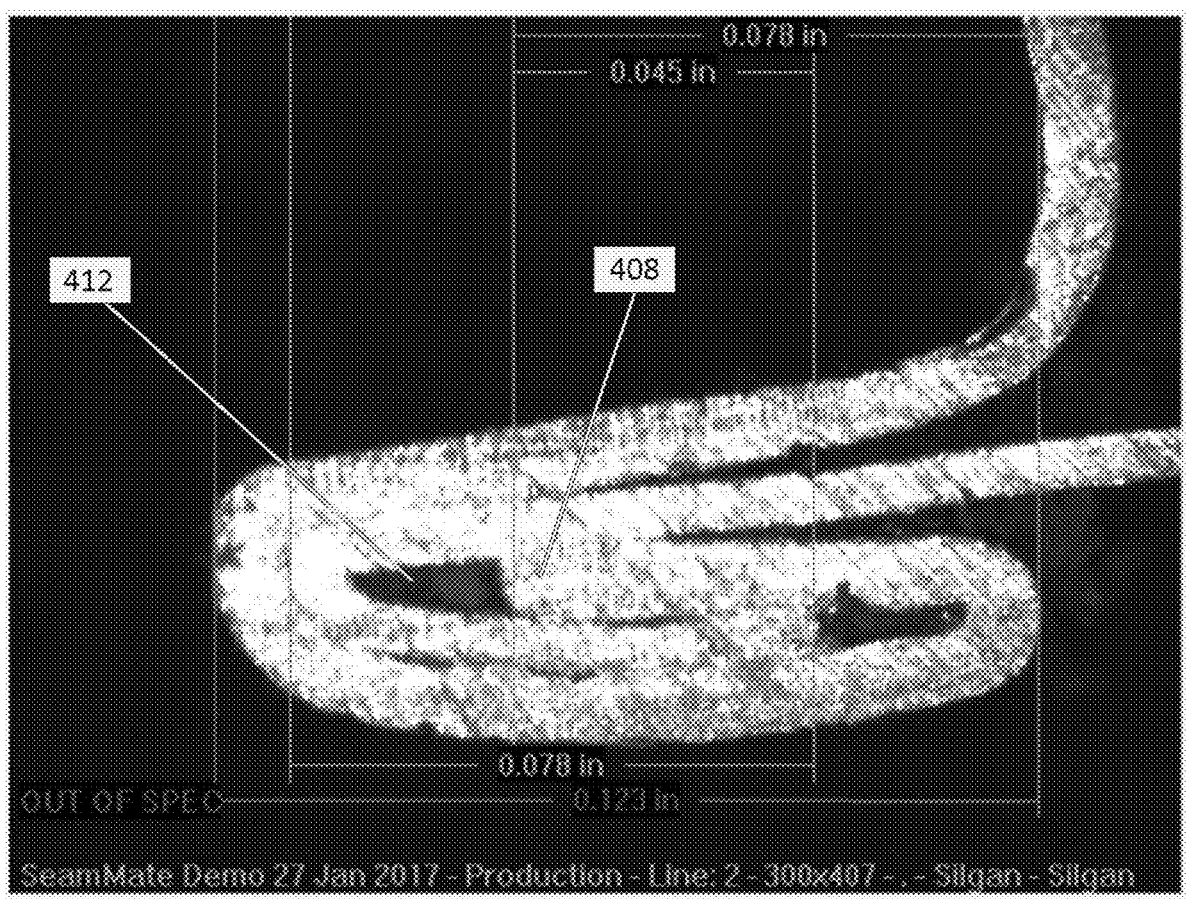
Figure 5:
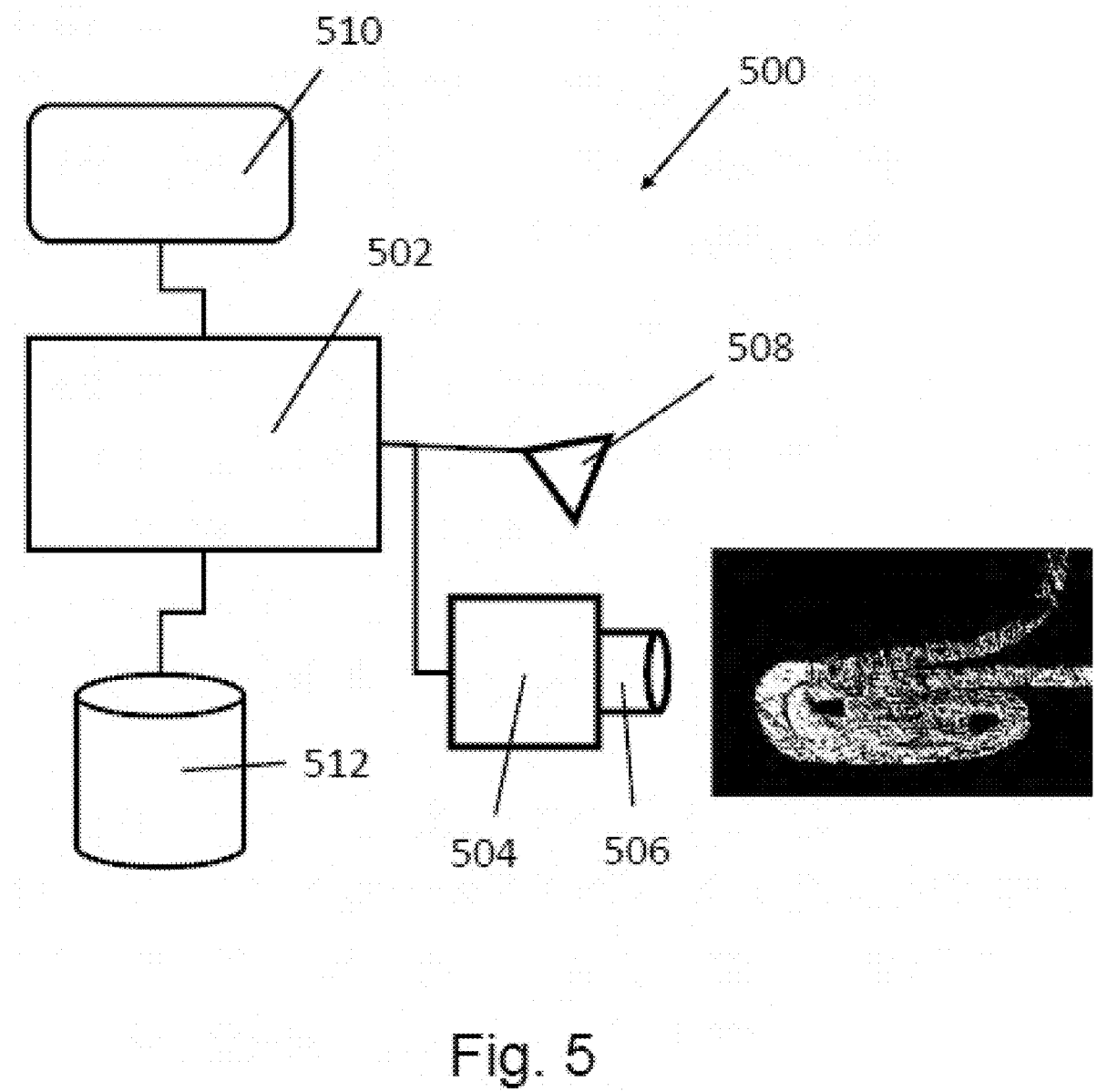
FIG. 5 is a block diagram of a system for measuring crimped container seams, according to an exemplary embodiment.
Figure 6A:
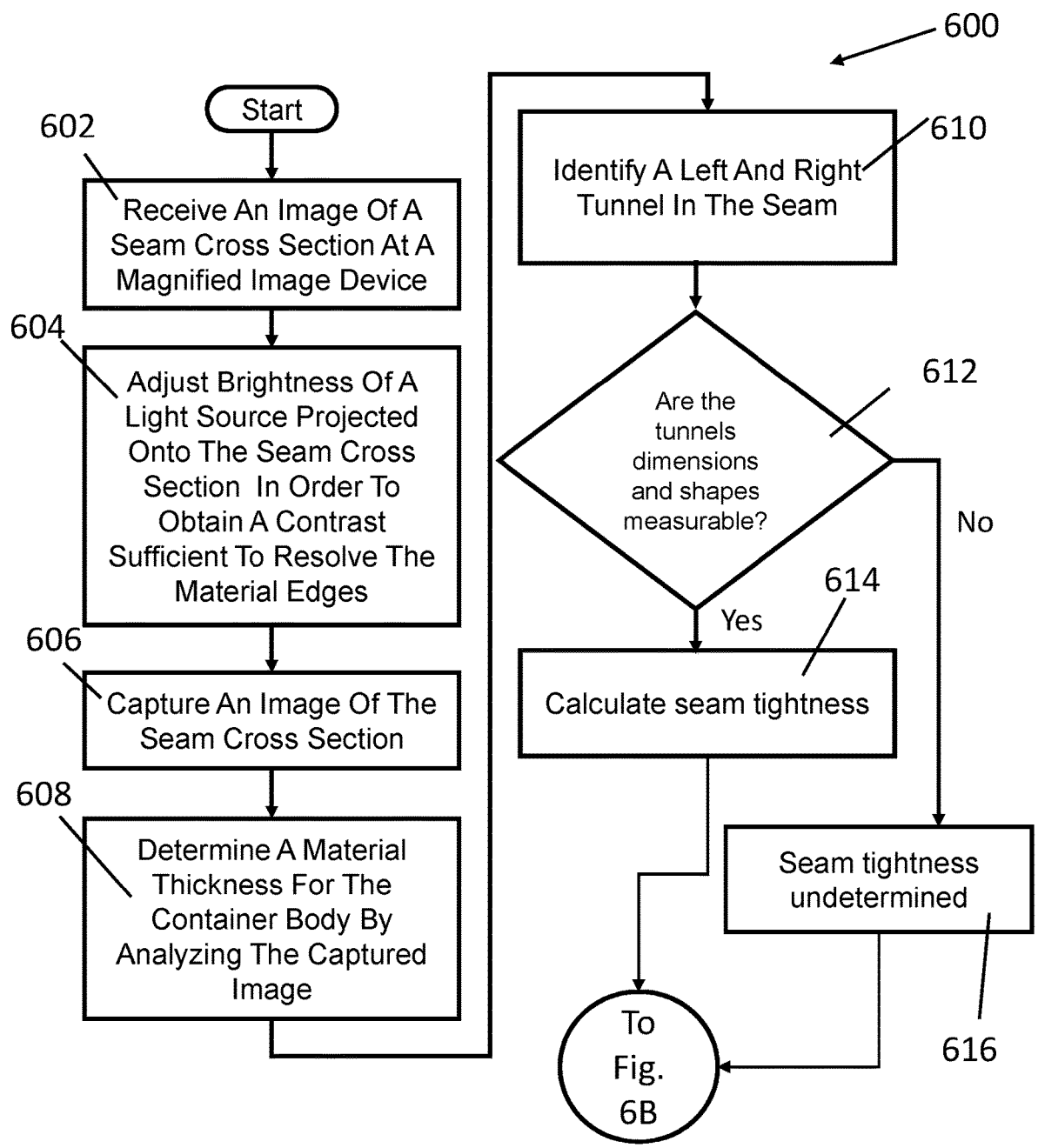
FIGS. 6A-6B is a flowchart of a method of measuring crimped container seams, according to an exemplary embodiment.
Figure 6B:
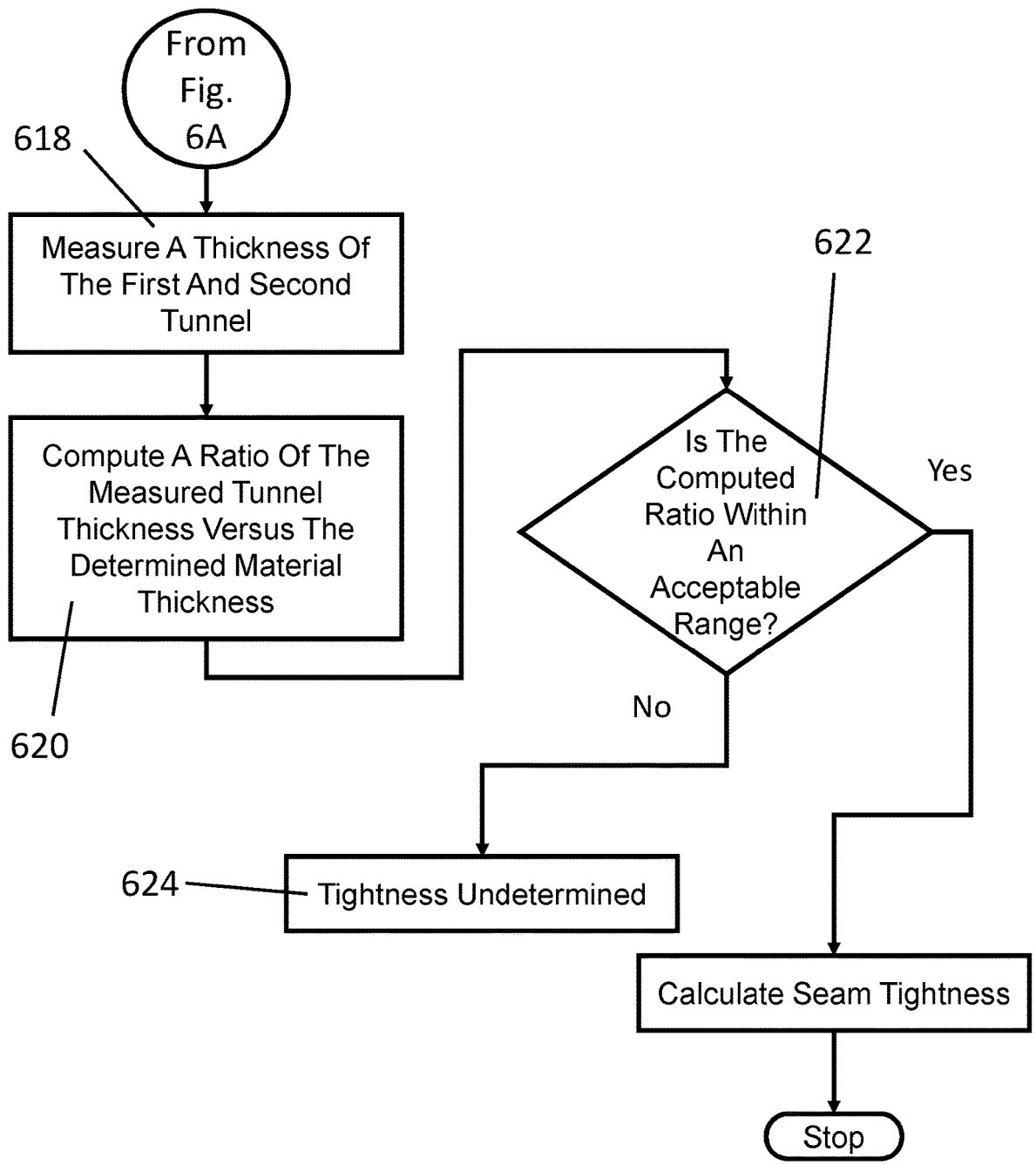

An exemplary embodiment of a seam inspection system 500 shown in FIG. 5, a controller 502 is configured to receive images from a camera 504 equipped with a magnifying lens 506. The controller also is in communication with an illuminating lamp 508, a display 510, and a memory 512. A can in which sections of the can body and lid have been removed to permit an image capture device to be positioned adjacent to a cross section 400 is placed in position relative to the camera 504 and magnifying lens 506. Referring to the process 600 illustrated in FIGS. 6A-6B, in an exemplary embodiment, the camera 504 fitted with a magnifying lens 506 receives an image of a seam cross-section 400 in step 602. In step 604, the controller 502 monitors the received image 400 and adjusts the brightness of the illuminating lamp to optimize the contrast of the image so as to enable the controller 502 to identify the edges of various components of the seam cross section. When the image is sufficiently optimized, the image is captured in step 606. The controller 502 analyses the captured image in step 608 to determine a material thickness that represents the thickness of the materials used to form the can body 100 and the lid 140. In certain cans, the can body 100 and lid 140 may be the same thickness however, in other types of cans the can body 100 and lid 140 may be formed from different thicknesses and materials. The discussion that follows is applicable to cans with same thickness and material or combinations of both different thickness and material. As shown in FIG. 4A, two voids are created during process of forming a seam. In FIGS. 4A-4D, these will be referred to as a left tunnel 402 and a right tunnel 404. These voids may also be referred to as body hook tunnels 242 and cover hook tunnels 240 as was the case in FIG. 2. In step 610, the controller 502 identifies the left tunnel 402 and right tunnel 404 and in step 612, determines whether the tunnel dimensions are sufficiently clear to be measured. If the tunnel dimensions can be measured, the controller generates a tightness rating 614. If the tunnel is not measurable, the controller generates an undetermined rating 615.

Refer now to FIG. 4B which shows an example of an improperly crimped seam. In the illustrated figure, the seam is crimped too loosely. The left tunnel 406 shows a dimension across its base that is larger than the thickness of the cover 408. This dimension would be detected in steps 620 and 622 of the process detailed in FIG. 6A-6B. FIG. 4C shows a properly crimped seam. It can be observed that the tunnel 410 has a base dimension that is approximately the same as the thickness of the cover 408. Thus, in the case of the seam of FIG. 4C, no alert would be generated.

A seam that is crimped too tightly is illustrated in FIG. 4D. As illustrated, the tunnel 412 is deformed when compared to the tunnel 410 of FIG. 4C. In this case, a determination of whether the tunnel dimensions and shapes are measurable takes place in step 612 of FIG. 6A. If the dimensions and shape are measurable, seam tightness would be calculated using tunnel dimensions in step 614. If unmeasurable, the value of seam tightness is stored as an indication of undetermined in step 616. This process is automated using the controller 502 so that an operator of the seam inspection system 500 could measure a number of seams without having to manually and thus subjectively determine if a seam is correct or if instead, the seam is improperly crimped.

Figure 7:
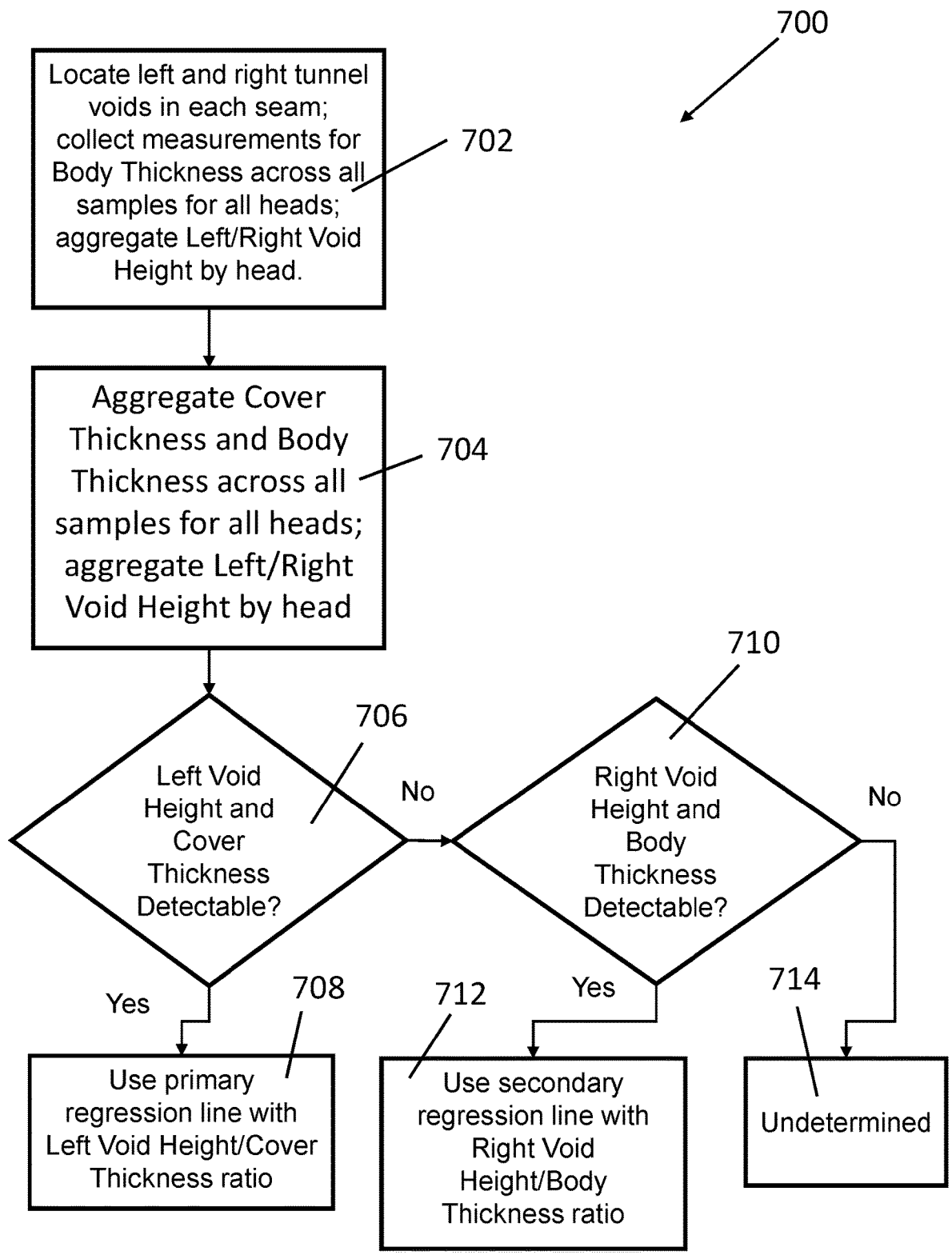
FIG. 7 is a flowchart illustrating the steps performed by a method of determining material thickness and detecting void heights according to an exemplary embodiment.

FIG. 7 represents a process of determining cover thickness and body thickness of each can in a sample lot. In step 702, each can from the lot subject to the image capture process detailed in FIG. 6. The left tunnel 402 and right tunnel 404 are identified as well as the cover and body thicknesses. In step 704, the cover and body thickness from each of the cans in the sample lot are aggregated as well as the left tunnel 402 and right tunnel 404 heights. This aggregated thickness is used to determine thickness used in the calculations performed in FIG. 6B step 620. When the cover and body thicknesses are aggregated, captured images are processed to determine if the left tunnel 402 and right tunnel 404 thicknesses are detectable in steps 706 and 710. These thicknesses may not be detectable as the result of obstructions such as sealant or metal from a seam cutting process. If the thicknesses are not detectable, an error message for the seam being examined is produced by the controller 502 in step 714. If the left tunnel thickness is detectable in step 706, a regression line is applied to the measurement in step 708. If the right tunnel thickness is detectable in step 710, regression line is applied to the measurement in step 712. These measurements are then used to generate an alert or report with regard to the measured seam.

What have been described above are examples. It is, of course, not possible to describe every conceivable combination of components for purposes of describing the examples of the disclosure described herein, but one of ordinary skill in the art will recognize that many further combinations and permutations of the examples are possible. Accordingly, the examples described herein are intended to embrace all such alterations, modifications and variations that fall within the scope of the appended claims and the application. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on. Moreover, although various aspects of the claimed subject matter have been described herein, such aspects need not be utilized in combination. It is therefore intended that the appended claims caver all such changes and modifications that are within the scope of the claimed subject matter.

The invention claimed is:

1. A system for measuring the crimp tightness of a container double seam, the system comprising:
 a processor;
 an image capture device in communication with the processor;
 a memory in communication with the processor, the memory comprising instructions that when executed by the processor cause the processor to:
  capture an image of a seam cross section using the image capture device;
  store the image;
  determine at least one of: a container wall thickness and a container lid thickness;
  identify at least one void in the image of the seam cross section;
  calculate a ratio using a dimension of the void and at least one of the container wall thickness and the container lid thickness;
  calculate a seam tightness rating using the ratio; and
  provide an indication to a user of the calculated seam tightness.

2. The system of claim 1, further comprising:
 an illumination device in communication with the processor; and
 instructions that when executed by the processor cause the processor to:
  adjust the illumination device to provide a level of illumination that permits the image capture device to capture the image of the seam that includes at least one void and the at least one of the container wall thickness and the container lid thickness.

3. The system of claim 1, further comprising a display device in communication with the processor, wherein the display device displays the indication to the user.

4. The system of claim 3, further comprising a user interface which displays an indication to the user for each seam in a measured lot of containers.

5. A system for measuring the crimp tightness of a container double seam, the system comprising:
 a processor;
 an image capture device in communication with the processor;
 a memory in communication with the processor, the memory comprising instructions that when executed by the processor cause the processor to:
  capture an image of a seam cross section using the image capture device;
  store the image;
  identify at least one void in the image of the seam cross section;
  characterize the shape of the at least one void;
  calculate seam tightness using the characterized shape; and
  provide an indication to a user of the calculated seam tightness.

6. The system of claim 5, further comprising:
 an illumination device in communication with the processor; and
 instructions that when executed by the processor, cause the processor to:
  adjust the illumination device to provide a level of illumination that permits the image capture device to capture an image of the seam that includes at least one void and a thickness of at least one of the container wall thickness and the container lid thickness.

7. The system of claim 5, further comprising a display device in communication with the processor which displays the indication to the user.

8. The system of claim 7, further comprising a user interface which displays a separate indication to the user for each of a plurality of seams in a measured lot of containers.

9. A method of measuring the crimp tightness of a container double seam comprising:

capturing an image of a seam cross section using the image capture device;

store the captured image;

determining at least one of: a container wall thickness and a container lid thickness;

identifying at least one void in the seam cross section;

calculating a ratio using a dimension of the void and at least one of the container wall thickness and the container lid thickness;

determining if the ratio falls outside of a predetermined range; and providing an indication to a user if the ratio falls outside of the predetermined range.

10. The method of claim 9, further comprising:

identifying at least one void in the seam cross section;

characterizing the shape of the at least one void;

determining if the characterized shape falls outside of a predetermined range; and providing an indication to a user if the characterized shape falls outside of a predetermined range.

11. The method of claim 9, further comprising:

adjusting an illumination device projecting light on a seam being examined to provide a level of illumination that permits the image capture device to capture an image of the seam that includes at least one void and a thickness of at least one of the container wall thickness and the container lid thickness.

12. The method of claim 9, further comprising;

capturing images of a plurality of containers to be examined; and performing the analysis of claim 9 on each of the captured images.

13. The method of claim 12, further comprising:

generating a user interface which displays an indication to the user for each seam in the plurality of containers to be examined.

* * * * *